(12) United States Patent
Baba (10) Patent No.: US 7,755,803 B2
(45) Date of Patent: Jul. 13, 2010

(54) IMAGE READING DEVICE AND METHOD, AND AN IMAGE FORMING APPARATUS AND METHOD

(75) Inventor: Toru Baba, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 1496 days.

(21) Appl. No.: 11/006,637

(22) Filed: Dec. 8, 2004

(65) Prior Publication Data

US 2005/0141049 A1 Jun. 30, 2005

(30) Foreign Application Priority Data

Dec. 9, 2003 (JP) .............................. 2003-410577
Nov. 9, 2004 (JP) .............................. 2004-324893

(51) Int. Cl.
*H04N 1/04* (2006.01)
(52) U.S. Cl. .................. 358/461; 358/463; 358/475
(58) Field of Classification Search ............ 358/461, 358/463, 475
See application file for complete search history.

(56) References Cited

U.S. PATENT DOCUMENTS

| | | | |
|---|---|---|---|
| 4,862,286 A | 8/1989 | Suda et al. | |
| 5,028,783 A | 7/1991 | Arakawa | |
| 5,130,788 A * | 7/1992 | Hirota | ......................... 358/516 |
| 5,151,796 A * | 9/1992 | Ito et al. | ...................... 358/461 |
| 6,011,636 A | 1/2000 | Tanaka et al. | |
| 6,188,493 B1 | 2/2001 | Esaki et al. | |
| 6,292,269 B1 | 9/2001 | Kawai | |
| 6,304,826 B1 | 10/2001 | Liu | |
| 2002/0122213 A1 | 9/2002 | Hill et al. | |

FOREIGN PATENT DOCUMENTS

| | | |
|---|---|---|
| JP | 62-12267 | 1/1987 |
| JP | 63-124672 | 5/1988 |
| JP | 63-314959 | 12/1988 |
| JP | 3-4676 | 1/1991 |
| JP | 4-53357 | 2/1992 |
| JP | 7-154597 | 6/1995 |
| JP | 8-181859 | 7/1996 |
| JP | 10-215374 | 8/1998 |
| JP | 2001-157006 | 6/2001 |
| JP | 2002-199218 | 7/2002 |

* cited by examiner

*Primary Examiner*—Houshang Safaipour
(74) *Attorney, Agent, or Firm*—Oblon, Spivak, McClelland, Maier & Neustadt, LLP (57) ABSTRACT

An image reading device having plural image sensors and a reading controller is disclosed. The image reading device is for obtaining image data over a subject by joining sub-image data outputs read by the image sensors, each image sensor comprising: a signal amplifier; and an A/D converter for converting an analog value output from the image sensor to a digital value; whereby the reading controller adjusts an amplification factor of each signal amplifier so that a read value of a white board read by each image sensor becomes a predetermined value.

14 Claims, 10 Drawing Sheets

IMAGE READING DEVICE AND METHOD, AND AN IMAGE FORMING APPARATUS AND METHOD

BACKGROUND OF THE INVENTION

1. Field of the Invention

The present invention relates to image reading devices and method, and image forming apparatus and method.

2. Description of the Related Art

Prior image forming apparatus compatible with A0 size subject paper uses only one close image sensor (referred to as "CIS" hereinafter). That is, such a prior image forming apparatus uses a CIS having a length of A0 size paper width to read an original subject. However, such prior image forming apparatus is very large and takes high manufacturing cost, resulting in high price of the image forming apparatus.

Figure 1:
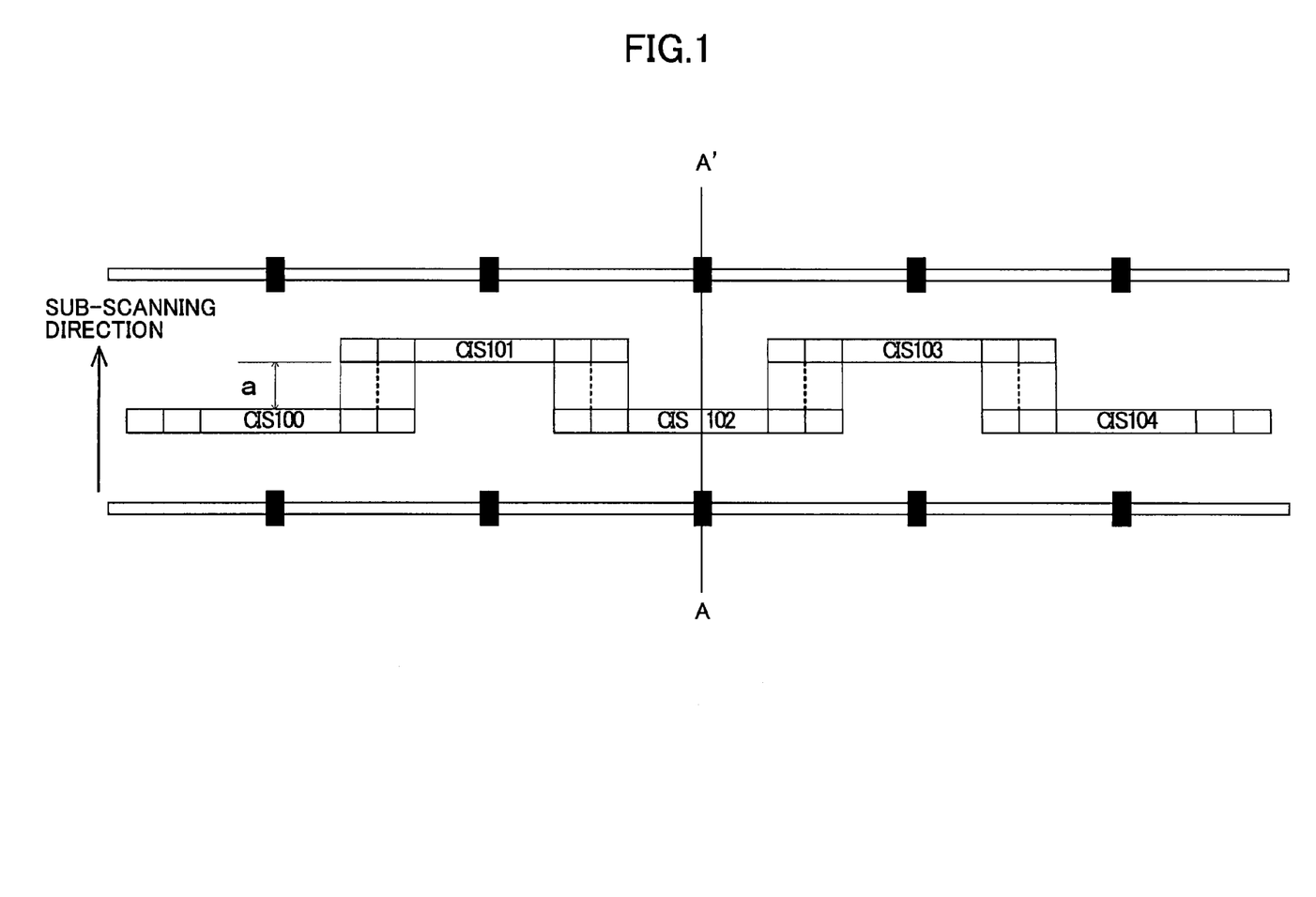
FIG. 1 shows an arrangement of plural CISs in an image reading device.

Therefore, as shown in FIG. 1, an image forming apparatus having 5 CISs equivalent to A4 size paper arranged zigzag is already known.

In order to accurately read the original subject and obtain good results, it is necessary that the image forming apparatus should correctly recognize white color as reference. Accordingly it is required to adjust the image forming apparatus to make it properly recognize the white color that is called "white color reference adjustment". The white color reference adjustment is a process wherein an output of the CIS reading light generated by a light source is adjusted (gain adjusted) to a predetermined output reference value by an amplifier (or a signal amplifier) before image forming.

Since a prior image forming apparatus compatible with A0 size paper has only one large CIS, even if a problem occurs in white reference adjusting, it is easy to re-adjust the white reference for the only one CIS during the following image processing step.

Patent Reference 1: Japanese Patent Laid-open Publication 2001-157006

Figure 2:
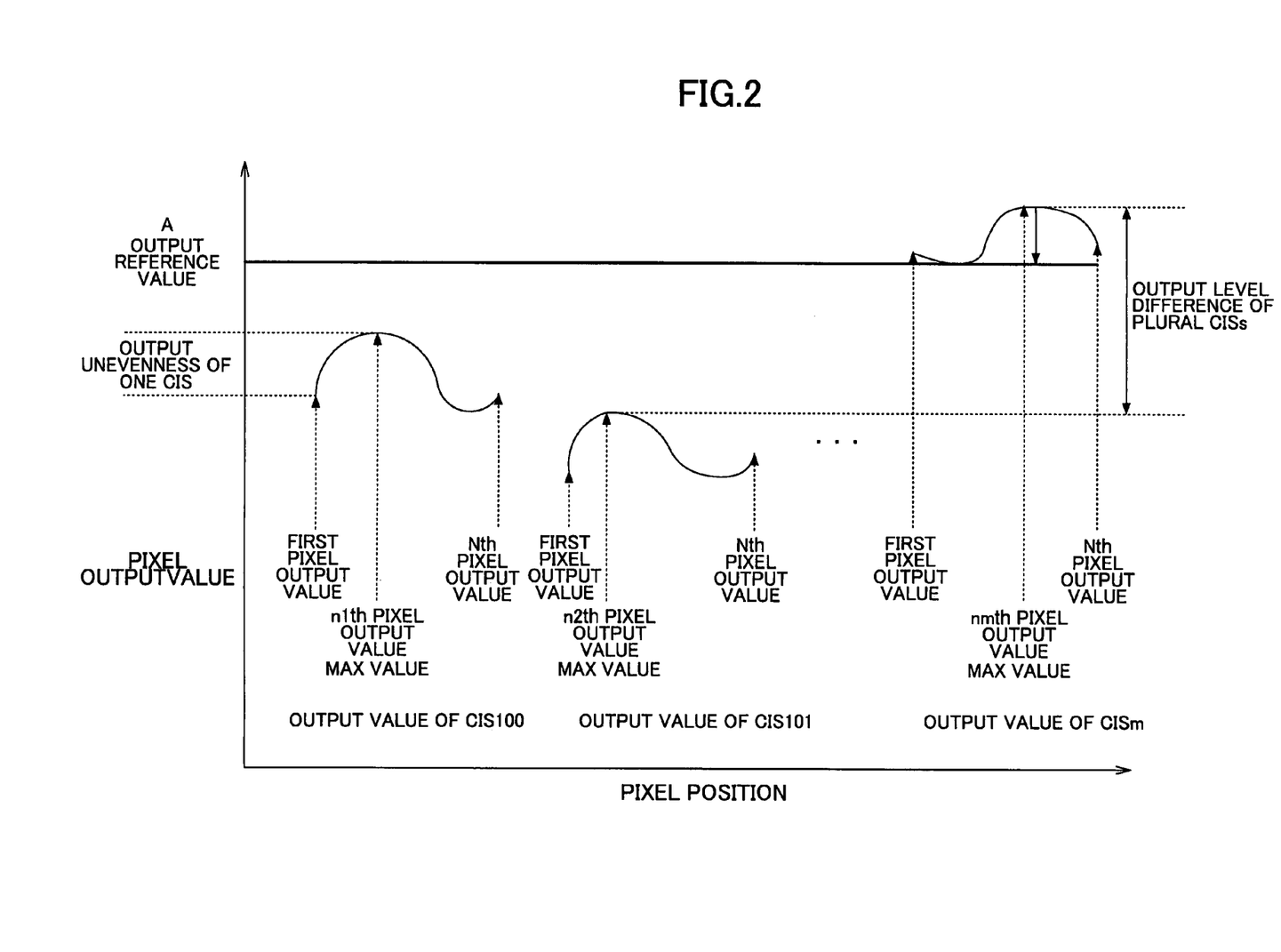
FIG. 2 shows a chart illustrating signal levels of plural CISs.

However, a prior image forming apparatus compatible with A0 size paper having plural CISs arranged zigzag, has only one amplifier (or signal amplifier), and therefore can adjust one white reference for only one CIS (e.g. CISm shown in FIG. 2), and the other CISs cannot be adjusted, resulting in variations in CIS outputs.

As a result, each CIS has a different white color reference, and when the same white color is read by plural CISs, some CISs output grey color, providing bad image forming.

SUMMARY OF THE INVENTION

Accordingly, it is a general object of the present invention to provide an image reading device and method in which the white reference value for each CIS is adjusted independently to reduce variation in white reference values of plural CISs and provide a white reference value common to each CIS.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by an image reading device and method and an image forming apparatus and method particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

According to one feature of the present invention, there is provided an image reading device having plural image sensors and a reading controller for obtaining image data over a subject by joining sub-image data outputs read by the plural image sensors, each image sensor comprising:
  a signal amplifier; and
  an A/D converter for converting an analog value output from the image sensor to a digital value;
  whereby the reading controller adjusts an amplification factor of each signal amplifier so that a read value of a white board read by each image sensor becomes a predetermined value.

According to another feature of the present invention, there is provided an image forming apparatus including the image reading device as explained above, comprising:
  an image processor for forming an image based on read values of the reference white board adjusted for each image sensor.

According to another feature of the present invention, there is provided an image reading method in an image reading device having plural image sensors and a reading controller, for obtaining image data over a subject by joining sub-image data outputs read by the plural image sensors, each image sensor comprising:
  a signal amplifier; and
  an A/D converter for converting an analog value output from the image sensor to a digital value;
  the image reading method comprising:
  a reading controlling step for adjusting an amplification factor of each signal amplifier so that a read value of a white board read by each image sensor becomes a predetermined value.

According to another feature of the present invention, there is provided an image forming method in an image forming apparatus having plural image sensors and a reading controller, for obtaining an image data over a subject by joining sub-image data outputs read by the plural image sensors, each image sensor comprising:
  a signal amplifier; and
  an A/D converter for converting an analog value output from the image sensor to a digital value;
  the image reading method comprising:
  a reading controlling step for adjusting an amplification factor of each signal amplifier so that a read value of a white board read by each image sensor becomes a predetermined value; and
  an image forming step for forming an image based on read values of the reference white board adjusted for each image sensor.

DESCRIPTION OF THE PREFERRED EMBODIMENTS

In the following, embodiments of the present invention are described with reference to the accompanying drawings.

First Embodiment

Figure 3:
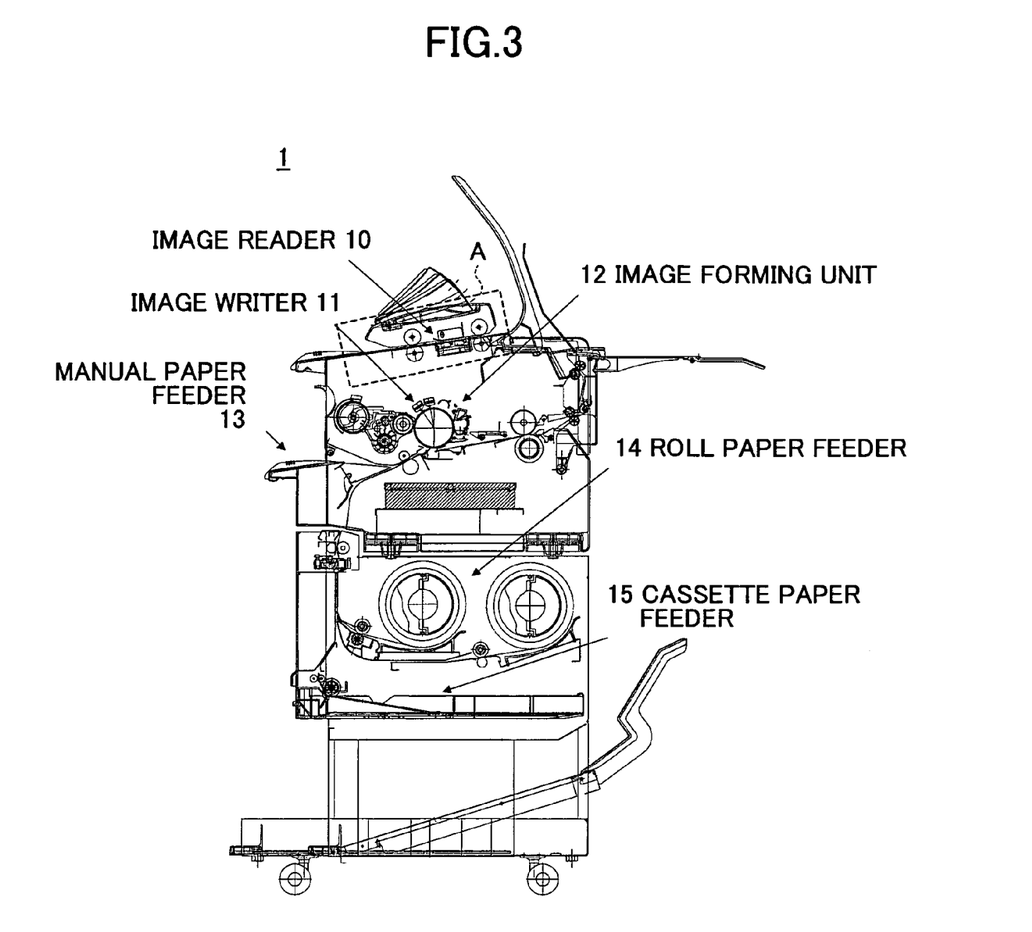
FIG. 3 generally shows an image forming apparatus to which the present invention may be applied.

FIG. 3 generally shows an image forming apparatus to which the present invention may be applied. As shown in FIG. 3, the image forming apparatus 1 comprises an image reader 10, an image writer 11, an image forming unit 12, a manual paper feeder 13, a roll paper feeder 14, and a cassette paper feeder 15.

The image reader 10 corresponds to an image reading device 50 (explained later), and reads image data and the like. The image writer 11 responds to image data read by the image reader 10, and writes the image on a paper fed by the roll paper feeder 14. The image forming unit 12 forms an image based on the image data ready by the image reader 10, to write it on a paper fed by the roll paper feeder 14. The manual paper feeder 13 is used when a user manually feeds a sheet of paper to the image forming apparatus 1. The roll paper feeder 14 supplies a sheet of paper contained in the cassette paper feeder 15 to the image writer 11. The cassette paper feeder 15 stores sheets of papers put by the user.

Figure 4:
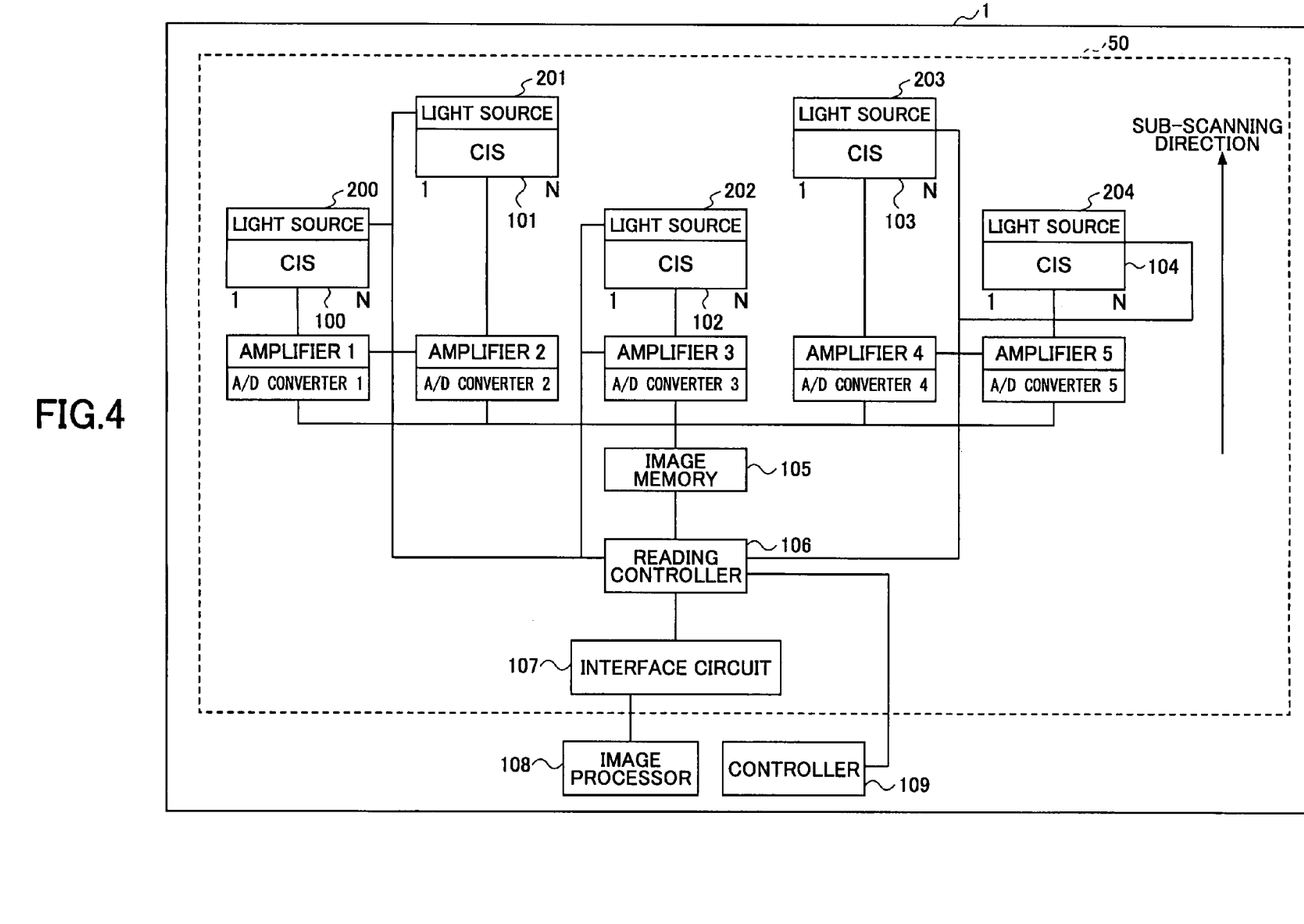
FIG. 4 is a block diagram of an example of an image forming apparatus according to a first embodiment of the present invention.

FIG. 4 is a block diagram of an example of an image forming apparatus 1 according to a first embodiment of the present invention.

The image forming apparatus 1 shown in FIG. 4 comprises an image reading device 50, an image processor 108, and a controller 109. The image reading device 50 comprises plural CISs 100~104 and light sources 200~204. The CISs and the light sources are arranged zigzag. Each of the CISs has N reading pixels, and each CIS 100~104 has a signal amplifier 1~5, and an A/D converter 1~5. The image reading device 50 further comprises an image memory 105, a reading controller 106 and an interface 107.

The light sources 200~204 emit light in response to a request from the reading controller 106 and others. The CISs 100~104 are image sensors that convert light signals (pixels) to electric signals. The amplifiers 1~5 amplify electric signals. The A/D converters 1~5 convert analog values (signals) output from corresponding CIS 100~104 and amplified by corresponding amplifier 1~5 to digital values (signals).

The image memory 105 relates to image reading and processing, and stores image data. The reading controller 106 performs white reference adjustment processing, which is explained later. The interface circuit 107 connects the image reading device 50 to the image forming apparatus 1, or connects the reading controller 106 of the image reading device 50 to an image processor 108 of the image forming apparatus 1.

A controller 109 controls the image forming apparatus overall. The image processor 108 forms an image, based on the reading value of the reference white board adjusted by the reading controller 106 for each CIS.

The white reference adjustment processing is performed by the reading controller 106 each time whenever the image forming apparatus 1 is first started (powered-on) by the user in the morning, or resumed or woken up from sleeping mode. The white reference adjustment process is performed so that the reading controller 106 makes the CISs read a white board 22 shown in FIG. 5. In this embodiment, it is assumed that the CISs of the image reading device 50 are arranged zigzag as shown in FIG. 1, which does not limit the scope of the present invention.

Figure 5:
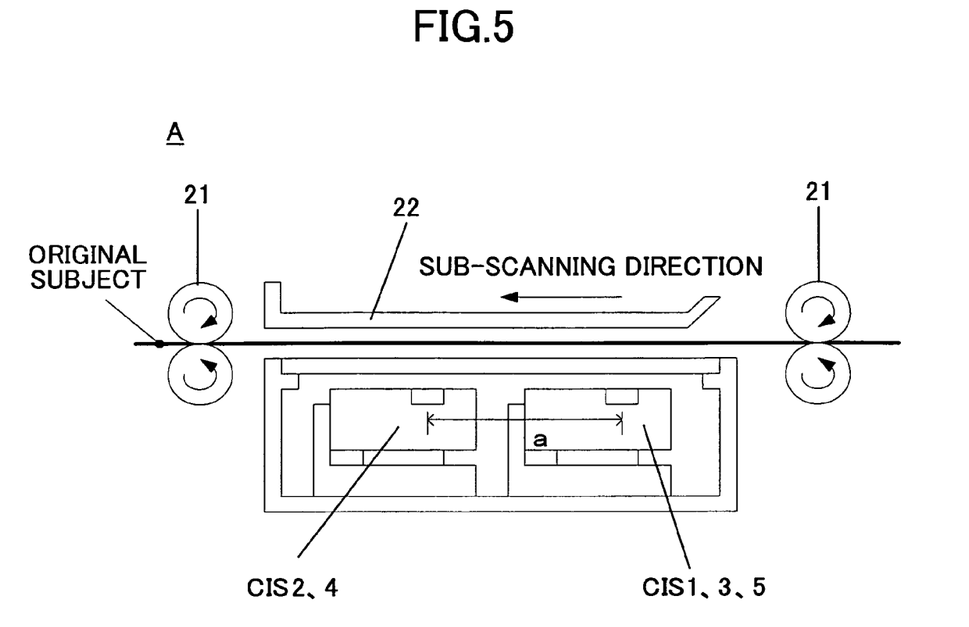
FIG. 5 is a cross-sectional view of the image reading device cut by A-A' plane in FIG. 1.

A cross section of the image reading device 50 cut by A-A' plane in FIG. 1 is shown in FIG. 5. The cross-sectional view of the image reading device 50 shown in FIG. 5 corresponds to a portion indicated by A in FIG. 3.

As shown in FIG. 5, the image reading device 50 includes conveying rollers 21, a reference white board 22 and CIS 1~5.

The conveying rollers 21 convey an original paper. The reference white board 22 is a white board used for white reference adjustment processing.

Figure 6:
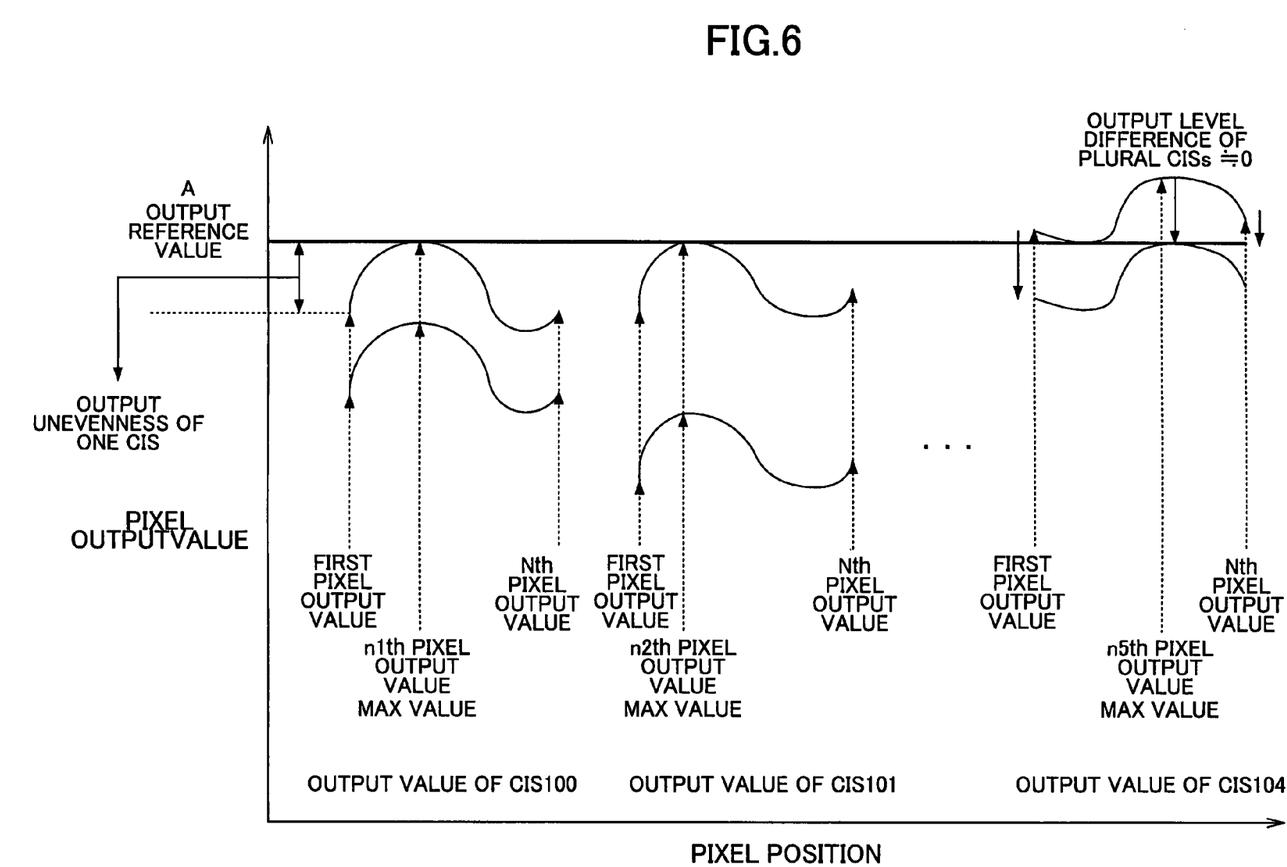
FIG. 6 is a chart illustrating signal levels of plural CISs that are adjusted by the reading controller 106.

FIG. 6 shows an example of signal levels of plural CISs, wherein their signal outputs are adjusted (amplification factor adjustment or white reference adjustment) by the reading controller 106.

When the image forming apparatus 1 is powered on by a user, the reading controller 106 turns on only the light source 200 corresponding to the CIS 100, and performs the white reference adjustment for the light from the light source 200. This white reference adjustment processing is processing wherein the reading controller 106 adjusts an amplification factor of the amplifier 1 so as to change a peak of a value (or output value) of the white reference 22 read by CIS 100 to a predetermined output value (for example, an output value A as shown in FIG. 6). The output value (or analog value) of the CIS after the white reference adjustment processing is converted to a digital value (for example, a digital value of 220 when 8-bit processing is carried out) by an A/b converter.

After the adjustment (white reference adjustment) of the amplification factor of the amplifier 1 corresponding to the CIS 100, the reading controller 106 turns off the light source 200 corresponding to the CIS 100. At that time, since the light sources 201~204 corresponding to other CIS 101-104 are also off, A/D converted output values from the CIS 100~104 are zero or close to zero (digital value equivalent to black).

Next, the reading controller 106 turns on only the light source 201 corresponding to the CIS 101, and performs the white reference adjustment processing against the amplifier 2 corresponding to the CIS 101. The reading controller 106 performs the same processing against the CIS 102~104 (or the amplifiers 3~5 corresponding the CIS 102~104). Then the white reference adjustment is finished for all the CISs (or all the amplifiers). As a result, the peak value of each CIS output value is changed to the reference value A and therefore there becomes no variation in the white reference values.

Since white paper reference values have no variation, image forming disorder or variation can be suppressed in the image processor 108. That is, by reducing the variation in the white paper reference values, the reading controller 106 can reduce the output unevenness over all pixels of the plural CISs to an extent that can be corrected by the image processor 108.

In the above explained embodiment, the reading controller 106 performs white reference adjustment on the CIS 100 to begin with. However, it is possible to begin with another CIS for performing white reference adjustment processing. No specific order is required in this and other embodiments.

Figure 7:
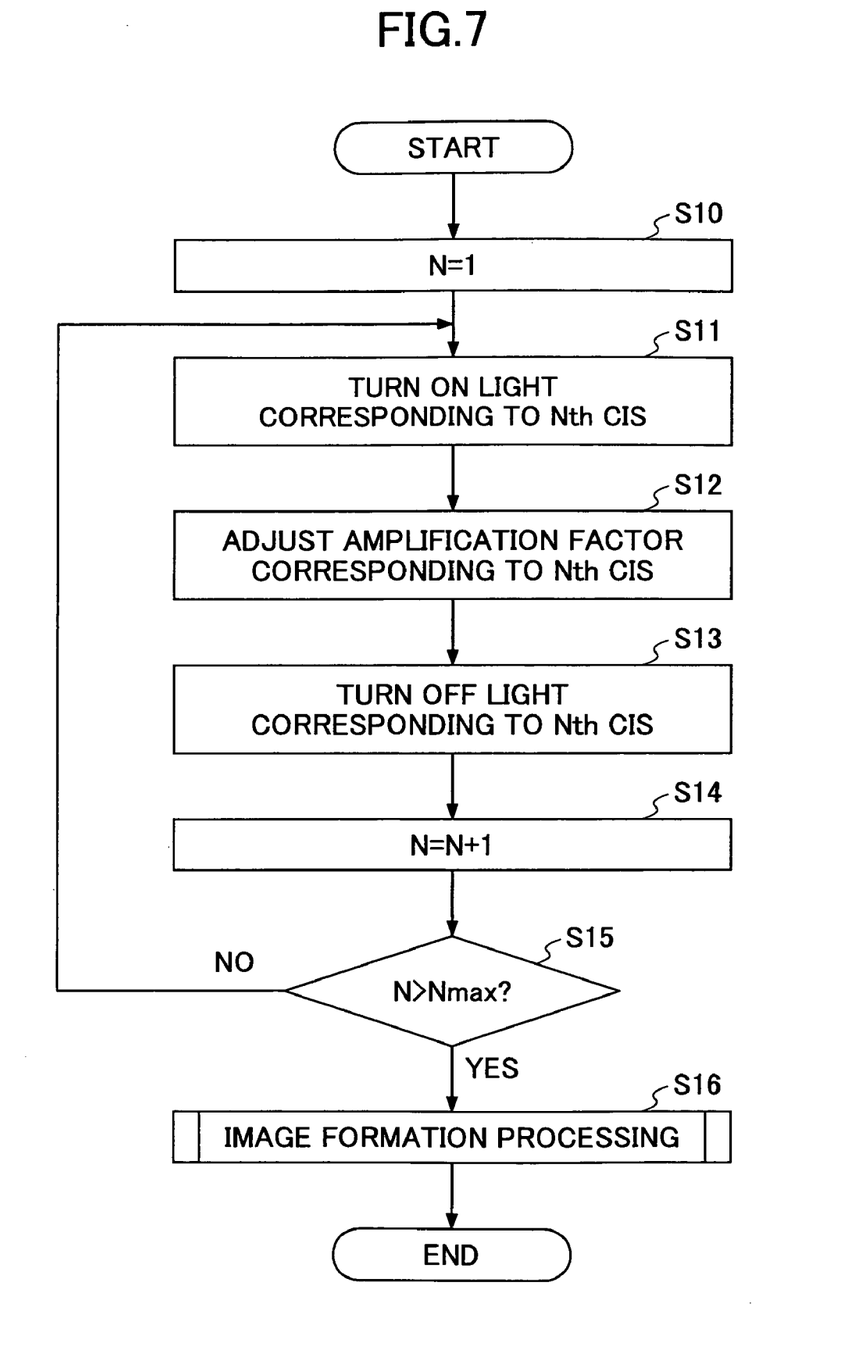
FIG. 7 is a flow chart showing procedure for the white reference adjustment processing in the reading controller and image forming processing in the image processor.

FIG. 7 is a flowchart showing a procedure for the white reference adjustment processing in the reading controller 106 and image forming processing in the image processor 108.

When the image forming apparatus 1 is turned on, the image controller 106 starts its procedure with step S10, where the image controller sets 1 to a counter N.

The procedure goes from step S10 to step S11, where the reading controller 106 turns on only the light corresponding to the Nth CIS.

The procedure goes from the step S11 to a step S12, where the reading controller 106 performs the white reference adjustment processing on the Nth CIS. That is, the reading controller 106 makes the Nth CIS read the reference white board 22, and adjusts the amplification factor of the amplifier corresponding to the Nth CIS so that the peak of the read values becomes a predetermined output value.

After the white reference adjustment processing is completed, the procedure goes from step S12 to step S13, where the reading controller 106 turns off the light corresponding to the Nth CIS.

The procedure goes from step S13 to step S14, where the reading controller 106 increases the counter N by one.

The procedure goes from step S14 to step S15, where the reading controller 106 determines if the counter N is larger than Nmax (that is the number of the CISs included in the image reading device 50). If the reading controller 106 determines that the counter N is larger than Nmax (YES at the step S15), the procedure goes to step S16. If the reading controller 106 determines that the counter N is equal to or smaller than Nmax (NO at step S15), the procedure returns to step S11, and repeats the above mentioned steps.

At step S16, the image processor 108 forms an image based on read values (white reference values) of the reference white board 22, which have been adjusted for each CIS by the reading controller 106.

The above processing is performed and there becomes no variation in the white reference values and no variation or disorder in image formation.

Second Embodiment

Other examples of the image forming apparatus 1, the white reference adjustment processing carried out by the reading controller 106 and image forming processing carried out by the image processor 108 are shown in a second embodiment. Mainly different points from the first embodiment are explained below.

Figure 8:
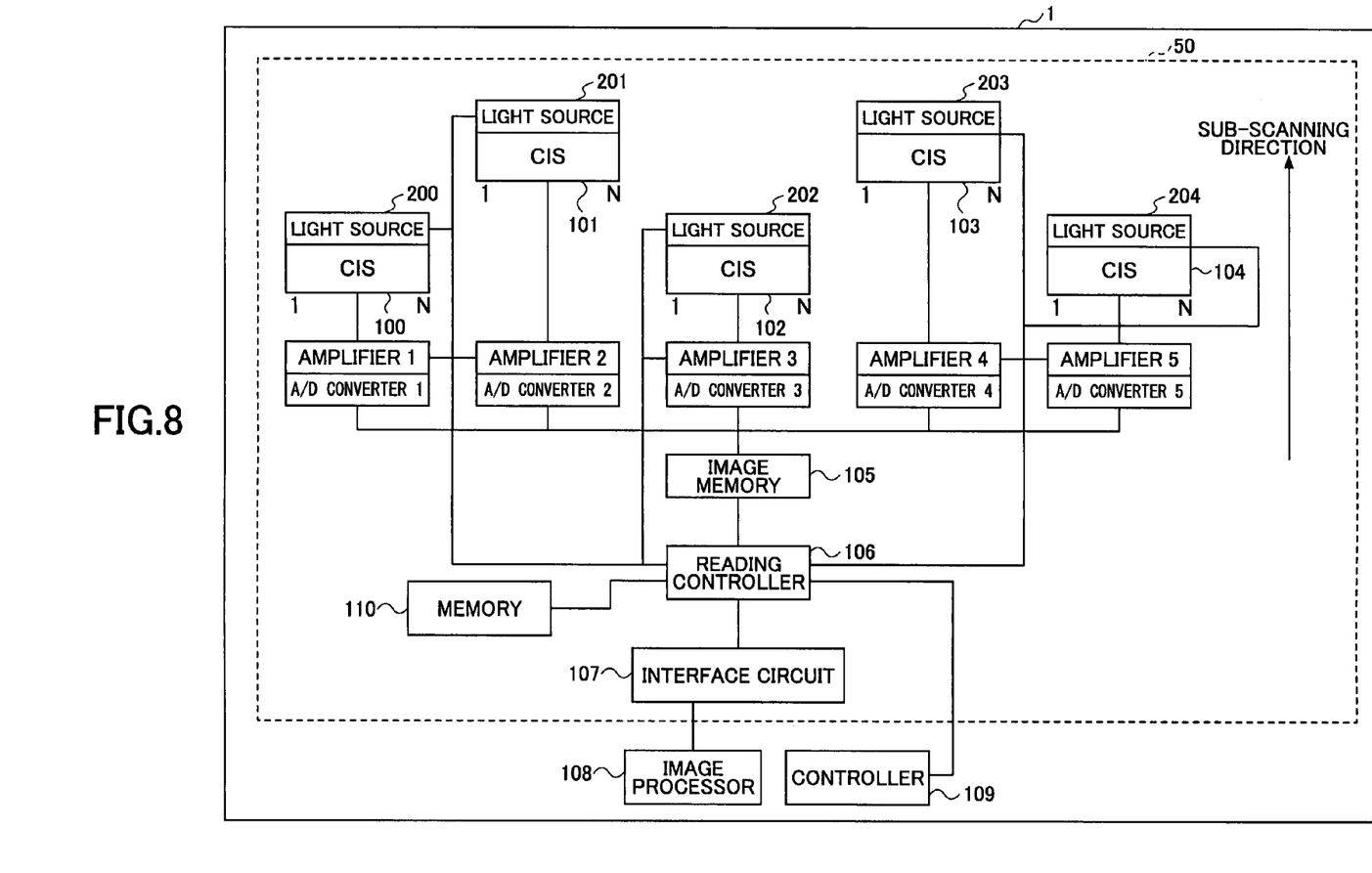
FIG. 8 is a block diagram illustrating a structure of an image forming apparatus according to a second embodiment of the present invention.

FIG. 8 is a block diagram illustrating a structure of an image forming apparatus according to the second embodiment of the present invention. The image forming apparatus 1 in the second embodiment further includes a memory 110.

The memory 110 stores adjustments values, etc., explained below, in response to a request from the reading controller 106.

When the image forming apparatus 1 is powered on by a user, the reading controller 106 turns on all the lights. Then the reading controller 106 begins the white reference adjustments with the CIS 100 (or the amplifier 1 corresponding to the CIS 100). When the reading controller 106 performs the white reference adjustment on the CIS 100 (or the amplifier 1 corresponding to the CIS 100), it forcibly minimizes the white reference adjustment values of other amplifiers 2~5 corresponding to other CISs 101~104. If the white reference adjustment is done in the range of 1 times~10 times, the reading controller 106 first forcibly makes the white reference adjustment values of the amplifiers 2~5 corresponding to the CIS101~104 "1 times" (that is 0 dB, the lowest sensitivity), and then performs the white reference adjustment on CIS 100 (or the amplifier 1 to CIS 100).

The reading controller 106, as shown in the first embodiment, adjusts the amplification factor of the amplifier 1 so that the peak of the read values (or the output values) of the reference white board 22 read by the CIS 100 becomes a predetermined output (output reference A in FIG. 6). After the white reference adjustments are completed, the reading controller 106 stores the amplification factor values (adjusted values) after the white reference adjustments into the memory 110.

The reading controller 106 performs the white reference adjustments on all the CISs (or the amplifiers corresponding to the CISs) in a similar manner. After the completion of the white reference adjustments of all the CISs (or the amplifiers), the reading controller 106 transfers the adjusted values stored in the memory 110 to the corresponding amplifiers 1~5, and turns off all the lights. The reading controller 106 may transfer the adjusted values to the corresponding amplifiers 1~5 after turning off all the lights.

As a result of the above white reference adjustment processing according to the second embodiment, the peak values of the CISs are set at the reference value A, that is there becomes no variation in the white reference values, as shown in FIG. 6 of the first embodiment.

Since there is no variation in white paper reference value, disorder or variation in image forming in the image processor 108 can be suppressed. That is, the reading controller 106 can remove variation in paper reference values, and reduce the output unevenness of all the pixels of plural CISs to a level that can be corrected by the image processor 108, etc.

Figure 9:
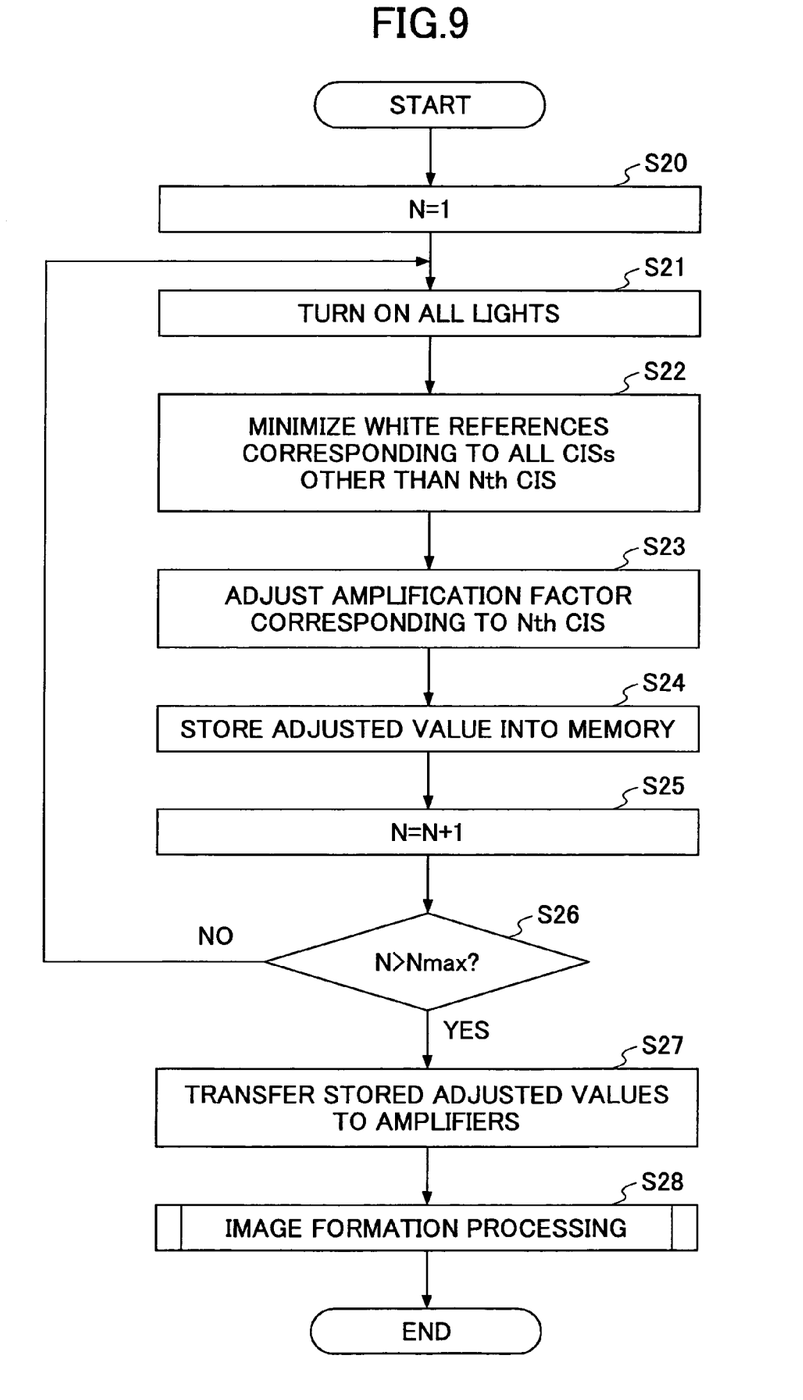
FIG. 9 is a flowchart showing another example of procedure for the white reference adjustment processing in the reading controller and image forming processing in the image processor.

FIG. 9 is a flow chart showing another example of procedure for the white reference adjustment processing in the reading controller 106 and image forming processing in the image processor 108.

When the image forming apparatus 1 is turned on, the image controller 106 starts its procedure with step S20, where the image controller 106 sets 1 to a counter N.

The procedure goes from step S20 to step S21, where the reading controller 106 turns on all the lights.

The procedure goes from step S21 to step S22, where the reading controller 106 forcibly minimizes the white reference adjustments of the amplifiers (e.g. amplifiers 2~5) corresponding to any CISs (e.g. CIS101~CIS104) other than the Nth CIS (e.g. CIS100).

The procedure goes from step S22 to step S23, where the reading controller 106 performs the white reference adjustment processing on the Nth CIS. That is, the reading controller 106 makes the Nth CIS read the reference white board 22, and adjusts the amplification factor of the amplifier corresponding to the Nth CIS so that the peak of the read values becomes a predetermined output value.

The procedure goes from step S23 to step S24, where the reading controller 106 stores (registers) the adjusted amplification factor (the adjusted value) into the memory 110.

The procedure goes from step 24 to step 25, where the reading controller 106 increases the counter N by one.

The procedure goes from step S25 to step S26, where the reading controller 106 determines if the counter N is larger than Nmax (that is the number of the CISs included in the image reading device 50). If the reading controller 106 determines that the counter N is larger than Nmax (YES at the step S26), the procedure goes to step S16. If the reading controller 106 determines that the counter N is equal to or smaller than Nmax (NO at step S26), the procedure returns to step S21, and repeats the above mentioned steps.

At step 27, the image processor 108 transfers the adjusted values stored in the memory 110 to the corresponding amplifiers (e.g. amplifiers 1~5).

The procedure goes from step 27 to step S28, where the image processor 108 forms an image based on read values (white reference values) of the reference white board 22, which has been adjusted for each CIS by the reading controller 106.

The above processing is performed and there becomes no variation in the white reference values and no variation or disorder in image formation.

In the second embodiment, each of the CISs does not have to have a separate light.

Figure 10:
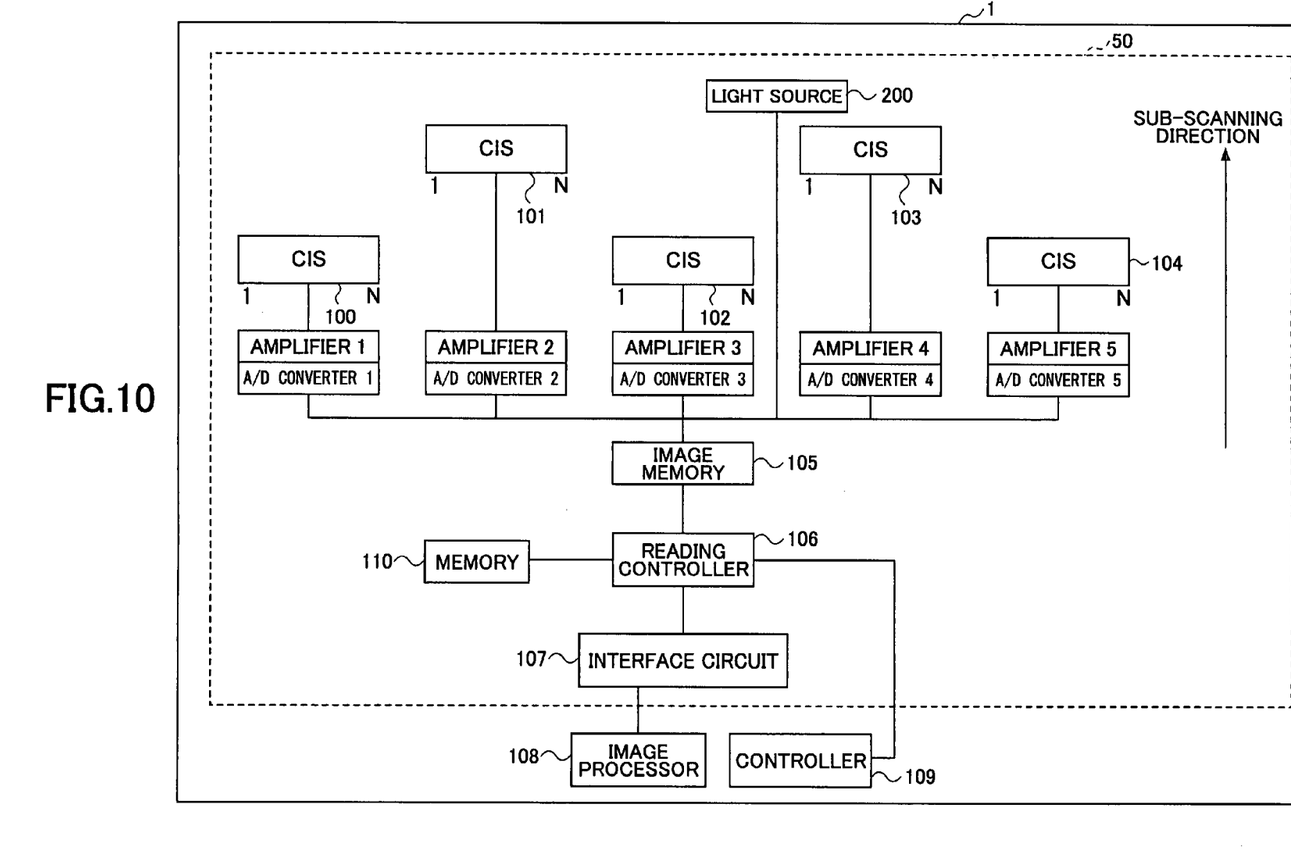
FIG. 10 is a block diagram of an image forming apparatus according to another embodiment.

FIG. 10 is a block diagram of an image forming apparatus according to another embodiment. The image forming apparatus 1 shown in FIG. 10 comprises only one light 200, whereby manufacturing cost can be reduced to lower the price of the image forming apparatus.

As explained above, according to the embodiments of the present invention, there becomes no variation in the white reference values of the CISs, and it is possible to adjust so that each CIS has a common white reference value.

The present invention is not limited to these embodiments, but various variations and modifications may be made without departing from the scope of the present invention.

The present application is based on Japanese Priority Applications No. 2003-410577 filed on Dec. 9, 2003, and No. 2004-324893 filed on Nov. 9, 2004 with the Japanese Patent Office, the entire contents of which are hereby incorporated by reference.

What is claimed is:

1. An image reading device having a plurality of image sensors and a reading controller, for obtaining image data over a subject by joining sub-image data outputs read by the image sensors, each image sensor comprising:
   a signal amplifier; and
   an A/D converter for converting an analog value output from the image sensor to a digital value;
   whereby the reading controller adjusts an amplification factor of each signal amplifier so that a read value of a white board read by each image sensor becomes a predetermined value,
   wherein each image sensor further comprises:
   a light source; and
   the reading controller adjusts the amplification factor of each signal amplifier by turning on and off each light source in turn.

2. The image reading device as claimed in claim 1, wherein the reading controller does not turn on the light source of any other image sensors other than the image sensor under adjustment, and digital values converted from the analog values output from said any other image sensors are zero or close to zero.

3. An image forming apparatus including the image reading device as claimed in claim 1, comprising:
   an image processor for forming an image based on read values of the white board adjusted for each image sensor.

4. An image reading device having a plurality of image sensors and a reading controller, for obtaining image data over a subject by joining sub-image data outputs read by the image sensors, each image sensor comprising:
   a signal amplifier; and
   an A/D converter for converting an analog value output from the image sensor to a digital value;
   whereby the reading controller adjusts an amplification factor of each signal amplifier so that a read value of a white board read by each image sensor becomes a predetermined value, the image reading device, further comprising:
   at least one light source; and
   a memory for storing adjusted values after adjusting the amplification factor of each signal amplifier;
   whereby the reading controller turns on all the light sources, minimizes the amplification factors of all the signal amplifiers except one signal amplifier, adjusts the amplification factor of said except one signal amplifier, and stores the adjusted value into the memory.

5. The image reading device as claimed in claim 4, wherein the reading controller adjusts the amplification factors of all the signal amplifiers, and then takes out the adjusted values from the memory, and gives the adjusted values to corresponding signal amplifiers.

6. The image reading device as claimed in claim 4, wherein one of the light sources is provided for each image sensor.

7. The image reading device as claimed in claim 4, wherein only one light source is provided in common to all the image sensors.

8. An image reading method in an image reading device having a plurality of image sensors and a reading controller, for obtaining image data over a subject by joining sub-image data outputs read by the image sensors, each image sensor including
   a signal amplifier; and
   an A/D converter for converting an analog value output from the image sensor to a digital value;
   the image reading method comprising:
   a reading controlling step, performed by said reading controller, for adjusting an amplification factor of each signal amplifier so that a read value of a white board read by each image sensor becomes a predetermined value,
   wherein each image sensor further comprises:
   a light source; and
   the reading controlling step adjusting the amplification factor of each signal amplifier by turning on and off each light source in turn.

9. The image reading method as claimed in claim 8, wherein the reading controlling step does not turn on the light source of any other image sensors other than the image sensor under adjustment, and digital values converted from the analog values output from said any other image sensors are zero or close to zero.

10. An image reading method in an image reading device having a plurality of image sensors and a reading controller, for obtaining image data over a subject by joining sub-image data outputs read by the image sensors, each image sensor comprising:
   a signal amplifier; and
   an A/D converter for converting an analog value output from the image sensor to a digital value;
   the image reading method comprising:
   whereby a reading controlling step, performed by said reading controller, adjusts an amplification factor of each signal amplifier so that a read value of a white board read by each image sensor becomes a predetermined value,
   each image sensor further comprising:
   at least one light source; and
   a memory for storing adjusted values after adjusting the amplification factor of each signal amplifier;

whereby the reading controlling step turns on all the light sources, minimizes the amplification factors of all the signal amplifiers except one signal amplifier, adjusts the amplification factor of said except one signal amplifier, and stores the adjusted value into the memory.

11. The image reading device as claimed in claim 10, wherein the reading controlling step adjusts the amplification factors of all the signal amplifiers, and then takes out the adjusted values from the memory, and gives the adjusted values to corresponding signal amplifiers.

12. The image reading method as claimed in claim 10, wherein one of the light sources is provided for each image sensor.

13. The image reading method as claimed in claim 10, wherein only one light source is provided in common to all the image sensors.

14. An image forming method in an image forming apparatus having a plurality of image sensors and a reading controller for obtaining image data over a subject by joining sub-image data outputs read by the plural image sensors, each image sensor including a signal amplifier; and an A/D converter for converting an analog value output from the image sensor to a digital value;

the image reading method comprising:

a reading controlling step, performed by said reading controller, for adjusting an amplification factor of each signal amplifier so that a read value of a reference white board read by each image sensor becomes a predetermined value; and an image forming step for forming an image based on the read values of the reference white board adjusted for each image sensor wherein each image sensor further comprises:

a light source; and the reading controlling step adjusting the amplification factor of each signal amplifier by turning on and off each light source in turn.

* * * * *